Sept. 5, 1967 N. N. STEPHANOFF 3,339,286
METHOD AND APPARATUS FOR DRYING WET PULVERULENT
MATERIAL IN A GASEOUS PATH
Filed March 11, 1965 2 Sheets-Sheet 1
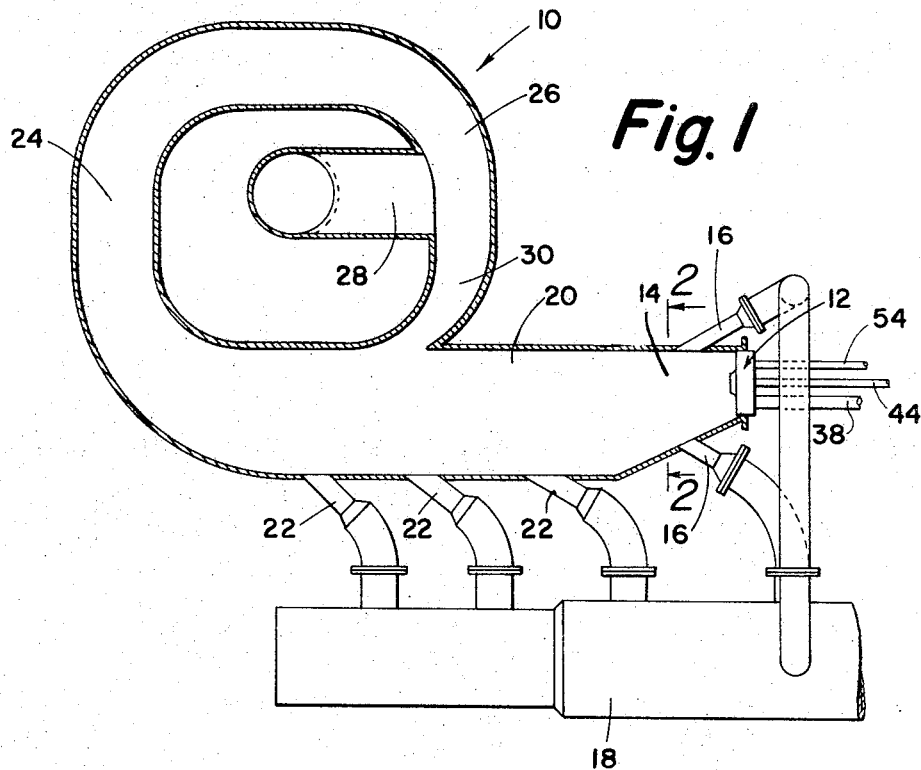
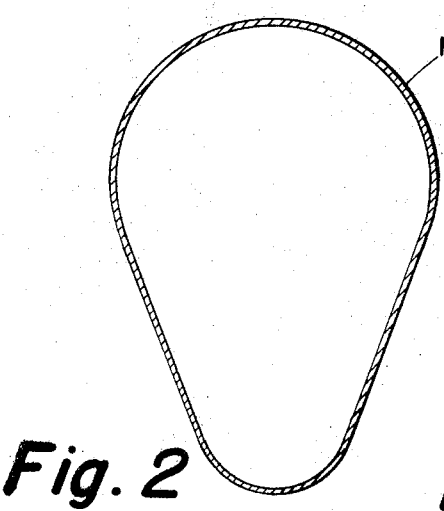
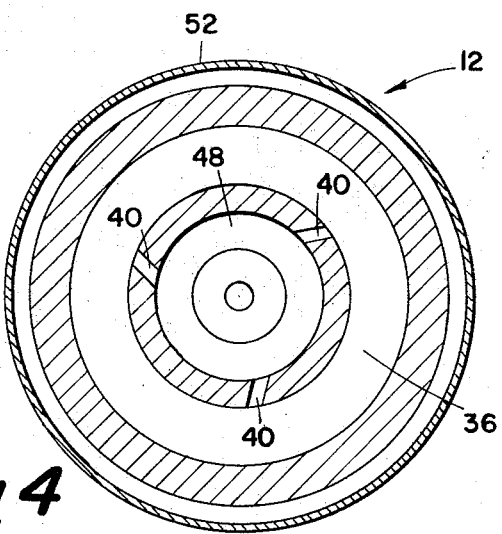
INVENTOR.
NICHOLAS N. STEPHANOFF
BY
*Arthur A. Jacobs*
ATTORNEY

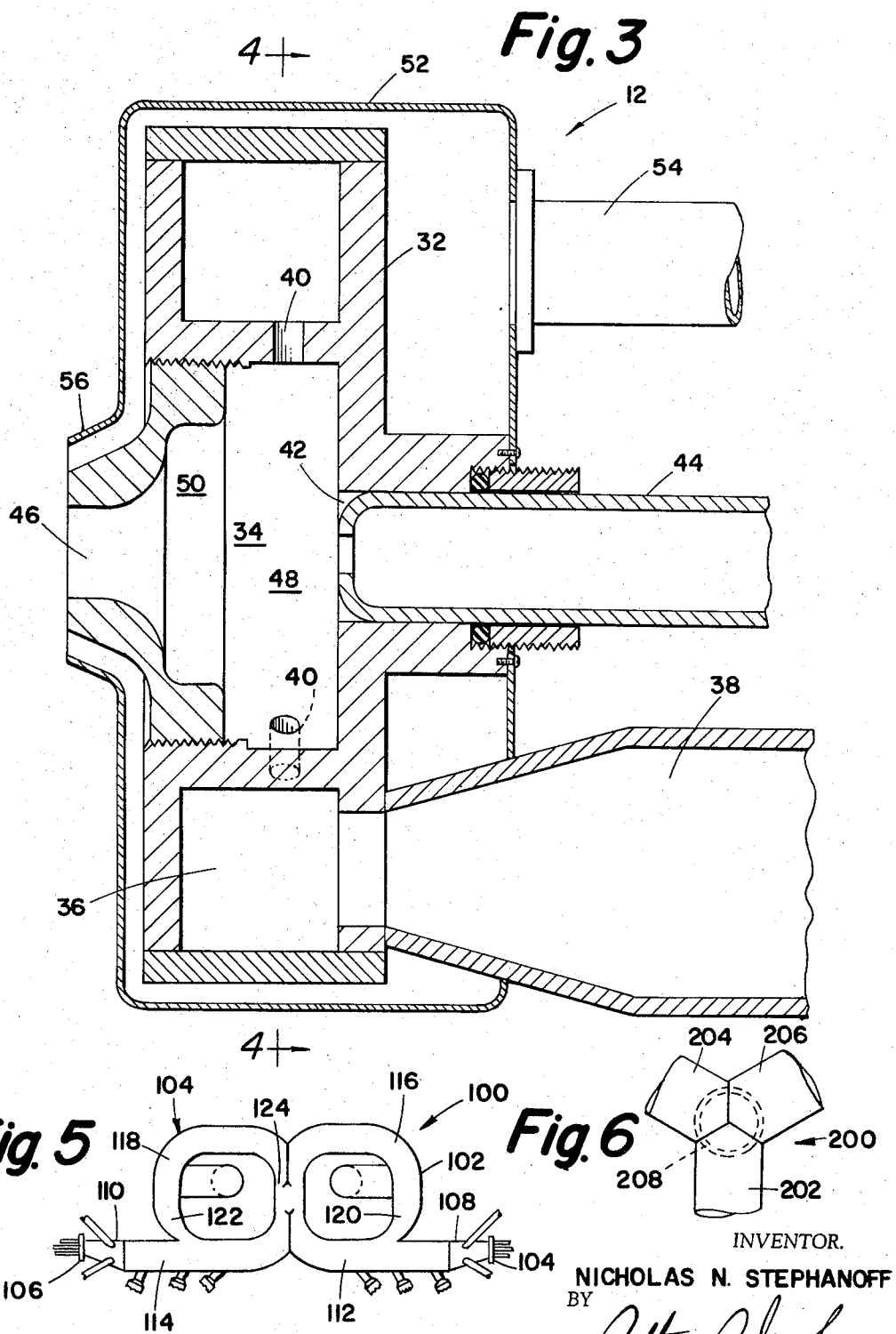

United States Patent Office 3,339,286
Patented Sept. 5, 1967

3,339,286
METHOD AND APPARATUS FOR DRYING WET PULVERULENT MATERIAL IN A GASEOUS PATH
Nicholas N. Stephanoff, Haverford, Pa., assignor to Fluid Energy Processing and Equipment Company, Lansdale, Pa., a corporation of Pennsylvania
Filed Mar. 11, 1965, Ser. No. 438,963
11 Claims. (Cl. 34—10)

ABSTRACT OF THE DISCLOSURE

This invention relates to the production of dry, colloidal size particles from wet, tacky precipitates and involves flash-drying the precipitated mass, without grinding or pulverization, to remove interfacial liquids before agglomeration takes place. This is accomplished by atomizing the colloidal material and projecting it in a straight path through a very hot flash-drying chamber to instantly remove substantially all the liquid, and then recycling the particles through a centrifugal mill remote from the flash-drying chamber and centrifugally removing the lighter, driest particles as they pass through the mill while recycling the heavier, less dry particles through the mill.

---

This invention relates to a method and apparatus for producing pulverulent material of very fine particle size, and it particularly relates to the production of pulverulent material having a mean particle size in the sub-micron range.

It is often highly desirable to obtain the utmost fineness in such pulverulent materials as pigments, fillers, coatings, ceramics, and the like, because the smaller the particle size, the more intermixing takes place with the other materials of the composition and the more surface exposure there is of the pigments and coatings. Maximum surface area exposure for pigments and coatings is important because the more exposure there is, the greater the tinting or hiding power. Hiding power is the ability of a paint or pigment to obscure a surface over which it is applied and is especially important in a white pigment such as titanium dioxide.

The utmost fineness for such materials is one wherein the individual particles are of the ultimate or primary size. However, such materials are generally initially obtained only in the form of chemical precipitates or colloidal suspensions in a liquid vehicle. In order to obtain the finished pulverulent product, it is necessary to remove the liquid vehicle from these precipitated solutions or colloidal suspensions.

Heretofore, when the liquid was removed by drying, the particles tended to agglomerate and, although the original precipitated or colloidal particle size usually corresponded to the ultimate particle size, it was never possible to regain this ultimate particle size once drying and agglomeration took place, even with the most intense grinding methods available. It is believed that this was due to the action of Van der Waal's forces. When primary or ultimate particles (entities which can be subdivided only by breaking primary valence bonds) are in very close proximity, the molecular forces of attraction (Van der Waal's forces) become extremely strong. At distances less than 0.3 or 0.4 micron, the molecular attractions become so enormous that the material is reluctant to flow and tends to bank up in storage bins and agglomerate on the walls of the grinding mills. The cohesion of the particles in these agglomerates is so intense that no amount of ordinary grinding can reduce them to their original precipitated or colloidal size.

It is one object of the present invention to provide a method and apparatus for treating precipitated or colloidal dispersions in such manner that a dry, pulverulent product is obtained having a particle size corresponding to the initial precipitated or colloidal particle size.

Another object of the present invention is to provide a method and apparatus of the aforesaid type which obtains the desired results with the utilization of a minimum of high pressure fluid and therefore with minimum expense.

Another object of the present invention is to provide a method and apparatus of the aforesaid type which is effective in a single-stage operation rather than in multiple stage dehydration and grinding operations.

Other objects and many of the attendant advantages of this invention will be readily appreciated as the same becomes better understood by reference to the following description when read in conjunction with the accompanying drawings wherein:

FIG. 1 is a view, partly in section and partly in elevation, of an apparatus embodying the present invention.

FIG. 2 is a sectional view, taken on line 2—2 of FIG. 1.

FIG. 3 is an enlarged, detailed sectional view of the internal mix-atomizing nozzle assembly.

FIG. 4 is a cross sectional view, taken on line 4—4 of FIG. 3.

FIG. 5 is a side elevational view of an alternative embodiment of the invention.

FIG. 6 is a fragmentary top plan view of a portion of a third embodiment of the invention.

In accordance with the present invention, the raw feed, comprising solid precipitated or colloidal particles in a liquid vehicle, is introduced in an internal mix-atomizing nozzle assembly where it is subjected to the vortex action of a high pressure elastic fluid (gas or vapor) at relatively low temperature, preferably at room temperature.

The particular nozzle assembly structure and the functioning thereof, including theoretical considerations therefor, will be hereinafter more thoroughly set forth and discussed. In brief, however, the vortex action in the nozzle assembly results in atomization of the raw feed and its ejection as an atomized spray into a flash-drying chamber. In this flash-drying chamber the now highly dispersed particles are subjected to the drying action of low-pressure hot gases which very rapidly evaporate the liquid coatings adhering to the dispersed particles causing almost instant substantial drying of these particles. This rapid drying is directly due to the high dispersion of the particles which permits the entire surface of each particle to be enveloped by and subjected to the high temperature gases. As a result the individual particles are in a substantial dry state before any agglomeration can take place.

The flash drying chamber is straight and somewhat elongated to correspond to the straight path of travel of the high-velocity spray as it issues from the nozzle assembly. The particular length of this chamber will vary with variation in the particle size of the material being treated, the velocity of these particles, the temperature of the hot gases, etc. In general, the drying chamber should be of a length sufficient to permit the particles to become substantially dry during their travel from the nozzle assembly to the opposite end of the drying chamber. In this manner, by the time the particles reach the end of the drying chamber, they are substantially dry and will not tend to agglomerate. The drying chamber is constructed with a trapezoidal cross-section having a relatively narrow portion at the bottom and a relatively wide portion at the top. This shape conforms to the trapezoidal shape of the inlet section of a circulating mill wherein the particles continue to circulate.

The inlet section of the circulating mill is a straight continuation of the drying chamber and, as stated, also has a trapezoidal cross-section. Additional hot, low-pressure gases are introduced into the narrow lower portion of the trapezoidal inlet section of the mill. Since these gases flow upwardly while the side walls of the section flare outwardly, this keeps the particles, some of which may not be completely dry, from contacting and adhering to the side walls. Furthermore, since the hot gas inlets are in the bottom of the inlet section of the mill, if a relatively small amount of material is being processed, it will gravitationally pass into the lower narrower region where it will be subject to the full influence of the drying gases. This is all, of course, also true of the trapezoidal drying chamber, especially when the hot gases are introduced only in the bottom portion thereof.

The straight inlet section of the mill is connected to a vertical up-stack section which, in turn, is connected to an arcuate classifier section where the lighter, and therefore more thoroughly dried particles, are separated and exhausted to a collection station. If any particles hav not been thoroughly dried, they will be heavier in weight and will pass down through a return section into the upper portion of the straight inlet section of the mill where they are again subjected to the heating action of the hot gases. In addition, the circulating gases, now substantially cooled by evaporation, pass through the return section into the upper portion of the inlet section where they act as tempering means. Due to the tempering gases washing over the practically dry particles at the beginning of the circulating cycle, very high temperatures can be used in this portion of the apparatus. The recycling also utilizes all the heat energy of the gases, enabling the apparatus to operate at almost 100% efficiency. The recycling action, furthermore, permits the apparatus to be relatively small and compact.

Referring more particularly to the various figures of the drawings wherein similar reference characters refer to similar parts, there is shown in FIGS. 1–4 a treating apparatus, generally designated 10, comprising a nozzle assembly 12 positioned at the inlet end of a flash-drying chamber 14. The chamber 14 is somewhat elongated and of trapezoidal cross-section, with its upper portion being relatively large and arcuate and its lower portion being relatively small and arcuate (as best shown in FIG. 2). The upper portion of the chamber 14 extends in a straight horizontal path while its lower portion is upwardly inclined from rear to front (as best shown in FIG. 1).

A plurality of inlets 16 lead into the chamber 14. A pair of such inlets, one on top and one on bottom, are illustrated. However, if desired, additional inlets 16 can be provided to lead into each side of the chamber 14. The inlets 16 are provided for the purpose of passing hot, low pressure gas or vapor, which is preferably air but may also be steam or any other elastic fluid desirable and feasible for the specific operation being performed, into the chamber 14. The source of such hot, low pressure gas is here illustrated in the form of a header 18 supplied with the gas from a source (not shown). Alternatively, the member 18 could be a combustion chamber and the gas could be the products of combustion.

The chamber 14 connects with a straight inlet section 20 of a vortex-type drying mill. The inlet section 20 has the same trapezoidal cross-section as chamber 14 but extends in a horizontally straight direction both at its upper and lower edges. A plurality of inlet ducts 22 lead tangentially from the header 18 into the bottom of the section 20. The tangential ducts 18 plus the preferably tangential ducts 16 create a fluid vortex. Although three such ducts 22 are shown, the number may be varied to suit the type of materials being treated and the conditions under which the operation is to be carried out.

At its rear end, the inlet section 20 is in open connection with an upstack section 24 of the mill. This upstack section is circular in cross-section, with its diameter gradually diminishing from a size equal to the vertical diameter of the section 20 where it joins with that section to a narrower size at about the center of the upstack. This reduction in size is possible because the particles become drier and smaller and, therefore, occupy less volume. From there, the diameter of the upstack remains substantially constant through an upper arcuate portion which is in open connection with a similarly arcuate upper portion of a classifier section 26.

The classifier section 26 is also of circular cross-section but gradually narrows in diameter as its extends downwardly. It is also somewhat arcuate so that its return end 30, which leads into the top of the inlet section 20, is positioned at such an angle that a straight path therefrom is directed toward the rearmost of the inlet ducts 22 at the bottom of section 14.

By providing the chamber 14 and inlet section 20 with a large cross-sectional area in the upper portion, the efficiency of the apparatus is increased for varying conditions of material flow since, when a less than normal amount of material is circulating, it will be impelled by centrifugal force into the lower area of smaller cross-section and will there be more concentrated in the area of highest hot gas flow. This is especially true where the hot gas flow is all into the bottom area, as in the case of the inlet section 20. Furthermore, as previously stated, the inclined side walls keep the particles, some of which may not be completely dry, from contacting them and adhering thereto.

The action of the mill portion of the present apparatus is similar to the standard types of fluid energy drying or grinding mills in that the hot gases entrain the particles of pulverulent material and carry them in a vortex through the inlet section and up through the upstack and into the classifier section. During this passage through the mill, centrifugal force carries the heavier (therefore wetter) particles to the outer portion of the mill while the lighter (drier) particles move around the inner portion. As they pass through the classifier section, the lighter particles are exhausted through the outlet duct 28 to a collection station or to a station for further treatment while the heavier particles circulate back through the return section 30 into the inlet section 20 for further drying.

The internal mix-liquid gas nozzle assembly, generally designated 12, comprises a housing 32 having an inner chamber 34 surrounded by an annular chamber 36. A conduit 38 leads into the annular chamber 36 from a source (not shown) of high pressure elastic fluid, such as air or other gas or vapor. A plurality of lateral passages 40 (here illustrated as three in number) connect the annular chamber 36 with the inner chamber 34. These passages 40, which constitute high pressure fluid nozzles, are preferably arranged in angular or tangential directions wherein each nozzle is aimed at the outlet of the nozzle adjacent thereto in a counterclockwise direction (as viewed in FIG. 4).

The high pressure nozzles 40 should be so constructed as to produce at least acoustic velocities of the fluid passing therethrough. Preferably, they should each be of the abrupt type comprising a straight passage, such as shown in the drawings. Such abrupt type nozzles provide a minimum amount of turbulence at their outlets. However, if desired, a convergent-divergent type of nozzle may be used. Such convergent-divergent nozzle comprises a narrow or constricted center portion with outwardly flaring portions at each end, similar to a Venturi passage. The convergent-divergent type of nozzle provides superacoustic velocities which result in faster issuing streams with less turbulence.

The inner chamber 34 is provided with a central inlet opening 42 at its front end. Extending into the opening 42 is a conduit 44 having a rounded tip encompassing its outlet aperture. The conduit 44 is connected to the source of supply (not shown) of the material to be treated. The outlet end of the conduit 44 in the opening 42 is axially aligned with the nozzle outlet 46 leading from the chamber 34 into the flash-drying chamber 14.

The chamber 34 comprises a relatively wide, cylindrical front portion 48 into which the nozzles 40 tangentially eject their high pressure streams, and a narrower, cup-like portion 50 rearwardly of the portion 48. The cup-like chamber portion 50 tapers inwardly at its rear end to merge into the nozzle outlet 46.

Surrounding the housing 32 is a shroud 52 having an inlet conduit 54 leading to a source of elastic fluid (preferably air) under very low pressure. The shroud completely envelopes the housing 32 but is provided with a nozzle portion of its own, indicated at 56, which envelops the nozzle outlet 46 but is open to permit egress from the nozzle outlet 46. The low pressure gas passing from within the shroud and through its nozzle portion 56 forms a protective curtain or barrier around the spray issuing from the nozzle outlet 46. This fluid curtain acts not only to clean the nozzle outlet 46 to prevent agglomeration of particles thereon but also acts as a barrier to prevent any wet particles in the spray issuing from the nozzle outlet from impacting the walls of the flash-drying chamber and adhering thereto.

In the operation of the nozzle assembly 12, the gas issuing from the tangential nozzles 40 forms a very high intensity vortex with the circumferential velocity of the vortex increasing as it moves radially inward. Without being bound by any theoretical considerations, this is believed due to a circumferential as well as a tangential or linear increase or expansion of the progressive increments of the gas, this expansion effecting a pushing action on the preceding increments.

In any event, regardless of theoretical considerations, the radially inwardly increasing tangential component of the vortex gases causes a high vacuum in the center of the vortex, adjacent the feed inlet conduit 44. The resulting suction draws the material (usually in the form of a liquid slurry) from the conduit 44 into the vortex. This suction feed substantially eliminates any necessity for using pressure fluids as a feed means.

The high intensity vortex, while forming a suction feed in the center, also maintains the periphery free of particles, apparently because of the high circumferential velocity and high pressure at the periphery forming a sort of dynamic barrier. As a result, the nozzles 40 are maintained free of any adherence of wet particles.

The reduced chamber portion 50 acts as a weir to divert the flow of the vortex and the material entrained therein into the nozzle outlet 46. The substantial reduction of the diameter of the nozzle outlet 46 relative to the chamber 34 considerably increases the velocity of the gases and entrained material so that the resultant spray is ejected with great force.

The internal chamber of the nozzle assembly 12 should be relatively small in order to obtain higher circumferential and tangential velocities. In a nozzle assembly where the front chamber portion had a diameter of 1¼ inches and the rear chamber portion had a ¾ inch diameter, the vortex intensity produced a centrifugal force which was about one-half million times that of gravity when using room temperature air. At 700° F., the vortex intensity was one million times gravity.

In actual tests, using only 35 p.s.i.g. room temperature air, and using the assembly with the 1¼ inch front chamber and ¾ inch rear chamber, a —17 inch Hg suction was obtained with an air consumption of only 22 c.f.m. standard air, or about 100 lbs. air per hour. Under these conditions, 600 lbs./hr. of a slurry consisting of 46% by weight fine calcium carbonate having a specific gravity of 2.71, was fed into the apparatus. A very fine spray, with perfect dispersion, was obtained. In this manner, only 1 lb. of air was required per 6 lbs. of material treated. This is far less air than is required with any other dispersing apparatus heretofore available and, furthermore, the dispersion obtained with the present apparatus is far greater.

The above-described apparatus is utilizable with any pulverulent material and has been effectively used not only with the above-mentioned calcium carbonate but with many other hard-to-handle substances such as titanium dioxide, kaolin and the like.

FIG. 5 shows a modified form of the present invention. This modified apparatus, generally designated 100, comprises two units 102 and 104, each of which is substantially identical to the apparatus shown at 10 in FIG. 1 in that they each have a nozzle assembly, respectively designated 104 and 106 identical to nozzle assembly 12, respective flash-drying chambers 108 and 110 identical to chamber 14, straight mill sections respectively designated 112 and 114 identical to section 20, respective classifier sections 116 and 118 identical to classifier section 26, and respective return sections 120 and 122 identical to the return section 30. The upstack section 124 is also identical to the upstack 24, however, it is shared in common by both units 102 and 104.

In operation each unit 102 and 104 functions independently in the manner of the apparatus 10, however, a different material may be inserted in each and different operating conditions, such as different heat and pressures may be used. Such different materials, after being separately flash-dried, would then intermix in the upstack 124, whereby one operation could effect a complete process of drying and mixing. It is also possible to insert a coating material in one unit and particles to be coated in the other and then effect the coating in the upstack 124. It is also possible to effect a chemical interaction between two different products in the upstack or to utilize one of the materials as a catalyst for the treatment of the other.

Although two units are illustrated in FIG. 5, it is within the scope of the present invention to use any number of units desired, each for the separate initial treatment of a different material, all of which intermix in the common upstack. FIG. 6 illustrates an apparatus, generally designated 200, which is identical to that of FIG. 5 except that there are three units represented by the classifier portions 202, 204 and 206, all of which emerge from a common upstack 208 and merge with individual return sections extending back to individual inlet sections (not shown) similar to those shown at 112 and 144.

It is also within the scope of the present invention, although less preferable, to disperse the pulverulent material with a nozzle assembly, such as described above, and then flash-dry the highly dispersed particles with radiant heat or any other desirable and feasible heating means other than hot fluids.

Obviously, many modifications of the present invention are possible in the light of the above teachings. It is, therefore, to be understood that within the scope of the appended claims, the invention may be practiced otherwise than as specifically described.

The invention claimed is:

1. A method of drying wet pulverulent material to retain said material in colloidal particle size which comprises atomizing said material in a fluid vortex, spraying the particles of atomized material and fluid through a straight flash-drying path while heating said particles and fluid to a temperature that is sufficiently high to substantially evaporate any liquid adhering to said particles before said particles reach the end of said straight path, then centrifugally circulating said particles and fluid through a separation area where the most dry, lighter particles are centrifugally removed, and then continuing the circulation of the less dry, heavier particles in a centrifugal path that is spaced from the flash-drying path.

2. The method of claim 1 wherein a plurality of separate materials are each separately dispersed and sprayed into a separate flash-drying path at a temperature sufficiently high to evaporate any liquid adhering thereto, and are then intermixed prior to centrifugal separation of the lighter and heavier particles.

3. The method of claim 1 wherein the heating is provided by a vortex of hot elastic fluid.

4. Apparatus for drying wet pulverulent material comprising a straight, flash-drying chamber, an atomizing means at one end of said chamber, said atomizing means being constructed and arranged to project a stream of atomized particles in a straight path longitudinally of said chamber, heating means operatively connected to said flash-drying chamber, said heating means being constructed and arranged to provide sufficient heat to substantially evaporate any liquid adhering to said particles while said particles pass through said flash-drying chamber, a centrifugal mill at the opposite end of said flash-drying chamber, said mill having a straight inlet section in fluid connection with said flash-drying chamber and an arcuate section leading from that end of said inlet section which is remote from said flash-drying chamber back to a portion of said inlet section which is closer to but spaced from said flash-drying chamber, means operatively connected to said inlet section to centrifugally circulate said particles passing thereunto from said flash-drying chamber through said arcuate section, and centrifugal separation means in said arcuate section for centrifugally separating lighter particles and removing them from the circulation through said arcuate section.

5. The apparatus of claim 4 wherein said flash-drying chamber is provided with hot gas inlets, said hot gas inlets being connected to a source of hot, low pressure gas, said flash-drying chamber being in direct fluid communication with the inlet section of said centrifugal mill, said inlet section having hot gas inlets connected to a source of hot, low pressure gas.

6. The apparatus of claim 4 wherein there are a plurality of atomizing means, each operatively connected to an individual flash-drying chamber, each flash-drying chamber being operatively connected to an individual inlet section, and each inlet section being operatively connected to a common arcuate section.

7. The apparatus of claim 4 wherein said flash-drying chamber and said inlet section are trapezoidal in cross-sectional shape with corresponding relatively wide portions and relatively narrow portions connected by inclined side walls, both said flash-drying chamber and said inlet section having hot, low pressure gas inlets at least in their relatively narrow portions, and said arcuate section being in direct fluid communication with the relatively wide portion of said inlet section.

8. The apparatus of claim 4 wherein said atomizing means comprises a housing, an inner chamber in said housing, feed means for feeding wet pulverulent material into the central portion of said chamber, fluid pressure nozzles on the outer periphery of said chamber, the outlets of said nozzles being arranged tangentially in a common annular plane to provide a circulating fluid vortex around said central portion of said chamber, means connecting said nozzles to a source of fluid under pressure, and an outlet from said chamber, said outlet being axially aligned with said feed means but axially spaced therefrom by said chamber, said outlet being of smaller diameter than said chamber.

9. The apparatus of claim 4 wherein said inner chamber comprises a portion of relatively large diameter and a portion of relatively small diameter, said feed means leading centrally into said portion of relatively large diameter, said nozzles being on the periphery of said portion of relatively large diameter, and said outlet leading from said portion of relatively small diameter.

10. The apparatus of claim 4 wherein said inner chamber is surrounded by an annular outer chamber, said outer chamber being connected to said source of fluid under pressure, and said nozzles comprising angular passages connecting said inner and outer chambers.

11. The apparatus of claim 4 wherein a shroud encompasses said housing in spaced relation thereto, said shroud having an outlet portion surrounding the outlet from said inner chamber, and means connecting the interior of said shroud with a source of low pressure fluid.

References Cited

UNITED STATES PATENTS

| 2,100,588 | 11/1937 | Claus | 34—10 X |
|---|---|---|---|
| 2,284,746 | 6/1942 | Kidwell | 34—57 X |
| 2,297,726 | 10/1942 | Stephanoff | 34—10 |
| 2,413,420 | 12/1946 | Stephanoff | 34—10 |
| 2,460,546 | 2/1949 | Stephanoff | 34—57 X |
| 2,624,624 | 1/1953 | Kirschbaum | 239—403 X |
| 3,020,646 | 2/1962 | Joseph et al. | 34—10 |

FREDERICK L. MATTESON, Jr., *Primary Examiner.*

JOHN J. CAMBY, *Examiner.*